Feb. 14, 1967 C. G. HASSELMARK 3,304,135
BEARING FOR TROLLEY ROLLER SUPPORTING FRAME
AND METHOD OF MAKING
Filed Jan. 8, 1963
FIG.1
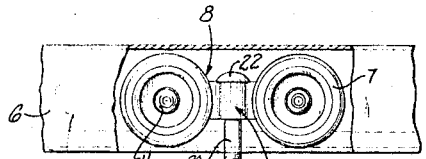
FIG.2
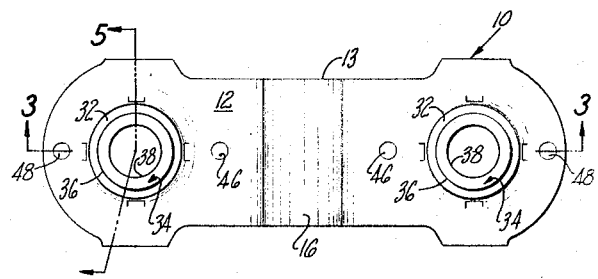
FIG.5
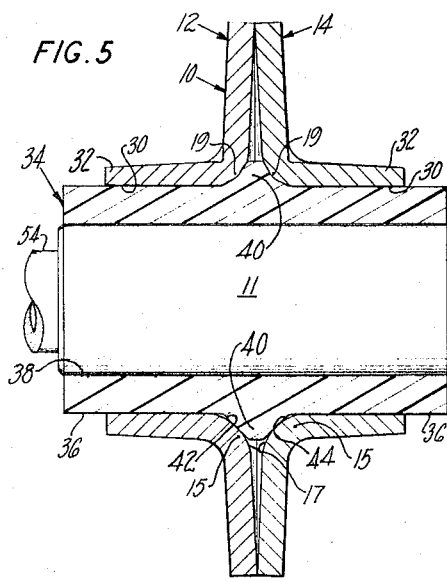
FIG.4
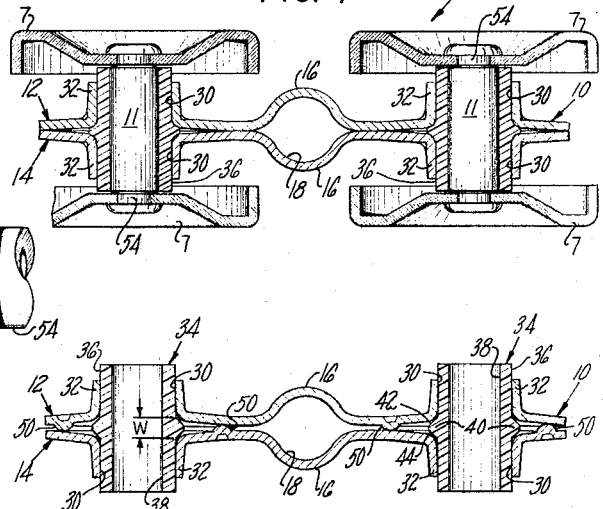
FIG.3
INVENTOR.
CARL G. HASSELMARK
BY Lindsey, Prutzman and Hayes
ATTORNEYS

United States Patent Office 3,304,135
Patented Feb. 14, 1967

3,304,135
BEARING FOR TROLLEY ROLLER SUPPORTING FRAME AND METHOD OF MAKING
Carl G. Hasselmark, New Britain, Conn., assignor to The Stanley Works, New Britain, Conn., a corporation of Connecticut
Filed Jan. 8, 1963, Ser. No. 250,044
2 Claims. (Cl. 308—30)

This invention generally relates to trolleys and more specifically to an improved trolley including a novel bearing assembly particularly suitable in supporting sliding doors or the like for sliding movement generally along a predetermined path.

One of the objects of the present invention is to provide such an improved trolley that will provide effective support over long periods of repeated and rugged use while at the same time possessing an improved construction which includes a minimum of parts that are extremely economical to manufacture and assemble.

A further object of the present invention is to provide a novel bearing assembly which may be easily incorporated as an improved trolley frame, into conventional guide systems for sliding doors and the like where it will provide improved operational effects as well as an increased service life for many of the parts therein.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

FIG. 1 is a fragmental elevational view, with portions broken away, of a supporting and guiding means for a sliding door and which includes a trolley constructed in accordance with the present invention;

FIG. 2 is an elevational view of the trolley frame shown in finally assembled position but with the trolley axles and rollers removed;

FIG. 3 is a cross-sectional view taken generally along lines 3—3 of FIG. 2 but showing the parts in position prior to the final assembly thereof;

FIG. 4 is a longitudinal cross-sectional view, with a portion broken away, of the trolley showing the parts in their finally assembled position; and FIG. 5 is an enlarged cross-sectional view taken generally along lines 5—5 of FIG. 2 and additionally showing an axle in fragment supported in the trolley frame.

Referring to the drawings in detail, FIG. 1 shows, for illustrative purposes, a top portion 2 of a sliding door 4 which is supported for sliding movement on a box-type track 6 through means of a trolley 8 including a roller supporting frame generally designated 10 constructed in accordance with the present invention.

In the shown embodiment, the frame 10 includes a pair of identically shaped elongated plates 12, 14 formed from a suitable metal and positioned in back-to-back or generally mirror-image relationship with each other. The center portion 16 of each plate 12, 14 is formed in a semi-circular fashion to provide a transversely extending passage 18 dimensioned to receive the hanger rod 20 for limited relative rotation. Rod 20 has an enlarged top end 22 engageable with the edges 13 of the frame plates and a lower end 24 adjustably received in the hanger bracket 9 to thereby connect the door 4 to the trolley 8. If desired, a suitable bearing (not shown) may be provided on the rod 20 between the top 22 thereof and the frame 10.

Referring to FIGS. 2 and 5, at the opposite ends of the frame plates 12, 14 there is provided, preferably by extrusion, a pair of aligned passages 30 each of which is defined by an annular flange 32 projecting laterally outwardly from the body of the plates 12, 14, and meeting the same at curved corner portions 15. The passages 30 are dimensioned to closely receive a generally cylindrical bearing sleeve 34 with the flanges 32 engaging the outer circumferential wall 36 of the bearing sleeve. The bearing sleeve 34, which is formed from a suitable high strength, self-lubricating material such as nylon, is provided with a through bore 38 dimensioned to receive a rotatable element such as the axle 11 of the trolley 8 which axle 11 has the rollers 7 non-rotatively fixed to the ends thereof as shown in FIGS. 1 and 4.

In accordance with the invention, there is provided a novel means for fixing the bearing sleeve 34 in the frame plates 12, 14 so as to preclude relative movement therebetween, comprising an annular rib or projection 40 raised from the outer circumferential wall 36 of the bearing sleeve 34 intermediate the ends thereof and which in the shown embodiment is integrally formed with the bearing sleeve 34 and includes side walls 42, 44. The annular rib 40 is clamped by the frame plates 12, 14 with the corner portions 15 of the plates firmly engaging the side walls 42, 44 of the rib 40. This is accomplished in the shown embodiment by welding the frame plates 12, 14 together at diametrically opposed points 46, 48. The side walls 42, 44 of the rib 40 in the shown embodiment are tapered and converge towards a point radially spaced from the circumferential wall 36 of the sleeve 34 so as to generally conform to the illustrated shape of the inner surface 17 of the corner portions 15 of the plates 12, 14. However, the side walls 42, 44 may be formed to equal advantage, without a taper depending on the particular shape of the frame plates at the inner surface of the corner portions 15 thereof.

FIG. 3 shows the relative positioning of the assembly parts prior to the welding operation wherein the frame plates 12, 14 are spaced from each other by the annular rib 40 of the bearing sleeve 34 and by the weld projections 50 provided on the inner surface of the frame plates 12, 14. The width dimension W of the rib 40 is such that when the plates 12, 14 are welded together at the weld projections 50, the plates 12, 14 will be drawn towards each other to thereby firmly clamp the side walls 42, 44 of the rib 40 whereby the bearing sleeve 34 will be fixed in the frame 10 against relative longitudinal and rotational movement with respect thereto.

In order to insure that the bearing sleeve 34 will be fixed in the frame 10 against relative rotational movement with respect thereto, the frame plates 12, 14 at the corner portions 15 thereof are deformed as by punching so as to provide inwardly extending projections 19 that will bite into engagement with the annular rib 40 at circumferentially spaced locations therearound to thereby provide added resistance to rotation of the sleeve 34 relative to the frame 10.

In its finally assembled position as shown in FIGS. 4 and 5, the bearing sleeve 34 is not only positively fixed against relative movement with respect to the frame plates 12, 14 but further is properly positioned therein so as to support the trolley axle 11 in the desired horizontal plane. Additionally, it is noted that the clamping action of the frame plates 12, 14 against the rib 40 is effected without imparting any significant radially directed compressive forces to the body of the bearing sleeve 34 whereby the cylindrical bore 38 of sleeve 34 is not distorted nor reduced in diameter.

In the final stages of assembly of the trolley, the axles 11 are inserted in the bores 38 of the bearing sleeve and the rollers 7 are nonrotatably fixed to the ends of the axles 11 by any suitable means such as that utilized in the shown embodiment where the reduced diameter end portions 54 of the axles 11 are riveted to the rollers 7.

Thus, it will be seen that the present invention provides a novel bearing assembly having a unique and improved construction consisting only of three parts which do not require close dimensional tolerances in the fabrication thereof and which may be easily assembled in a minimum of time and without requiring special tools or the like. It will additionally be seen that the present invention provides an improved trolley that will effectively support and journal the roller axle in a horizontal plane over long periods of repeated and rugged use and which may be used with conventional sliding doors and guiding systems therefor either with or without a guide track.

As will be apparent to persons skilled in the art, various modifications and adaptations of the structure above described will become readily apparent without departure from the spirit and scope of the invention, the scope of which is defined in the appended claims.

I claim:
1. A frame assembly for supporting a roller axle of a trolley and the like which comprises a pair of plates positioned in back-to-back relationship, each plate having an annular flange extending laterally outwardly from the plate and defining an aperture therein, said aperture of one plate being in axial alignment with said aperture of the other plate, a plastic bearing sleeve received in the apertures and having a through bore defining a bearing surface for rotatably supporting the roller axle, the sleeve including on its outer surface intermediate the ends thereof a circumferentially extending annular rib engageably received between the plates, at least one projection on the inner surface of at least one plate axially directed parallel to the bearing surface of the sleeve in biting engagement with its rib, and clamping means in the plates forcing the plates together and compressing the material of the rib in a direction parallel to the bearing surface to rigidly fix the sleeve between the plates against relative movement.

2. A method of making a roller supporting frame which comprises the steps of forming an aperture in each of a pair of substantially identical sheet metal plates, forming a bearing sleeve of plastic material, the sleeve being configured to provide a circumferentially extending rib on the outer surface of the sleeve intermediate its ends and a through bore within the sleeve defining a bearing surface, assembling said pair of sheet metal plates in back-to-back relationship over said bearing sleeve with the rib engageably received therebetween, securing the plates together to compress the material of the rib in a direction parallel to the bearing surface to rigidly fix the bearing sleeve between the plates against relative movement, and deforming at least one of the plates to provide at least one projection on the inner surface of the plate axially directed parallel to the bearing surface of the sleeve so that the projection is aligned with the rib in biting engagement therewith to further restrain the sleeve between the plates against relative rotational movement upon compression of the rib by the plates during the securing step.

References Cited by the Examiner

UNITED STATES PATENTS

| | | | |
|---|---|---|---|
| 1,482,579 | 2/1924 | Nice | 74—230.8 X |
| 1,819,334 | 8/1931 | North | 74—230.8 |
| 2,251,417 | 8/1941 | Parker. | |
| 2,615,764 | 10/1952 | Leake | 308—237 |
| 2,982,988 | 5/1961 | Blackmer | 16—97 |
| 3,055,639 | 9/1962 | Chaft | 308—X |

MARTIN P. SCHWADRON, *Primary Examiner.*

ROBERT C. RIORDON, DAVID J. WILLIAMOWSKY, *Examiners.*

D. C. CHAMPION, R. HESS, *Assistant Examiners.*